Figure 1:
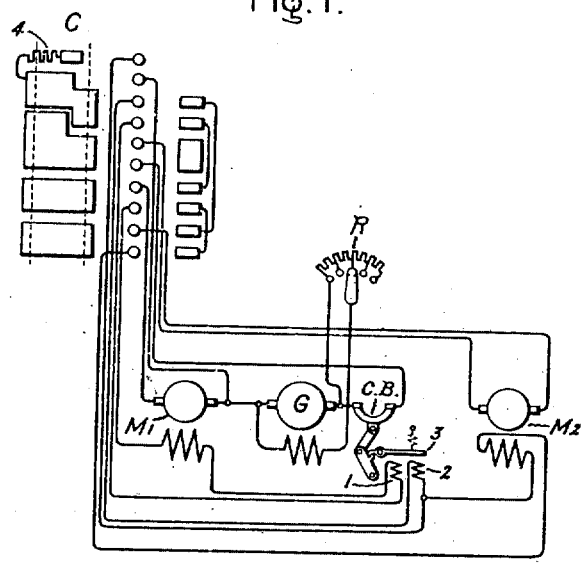

J. C. CLENDENIN.
MOTOR CONTROL.
APPLICATION FILED FEB. 21, 1917.

1,253,151.

Patented Jan. 8, 1918.

Inventor:
John C. Clendenin,
by Albert G. Davis
His Attorney.

UNITED STATES PATENT OFFICE.

JOHN C. CLENDENIN, OF LYNN, MASSACHUSETTS, ASSIGNOR TO GENERAL ELECTRIC COMPANY, A CORPORATION OF NEW YORK.

MOTOR CONTROL.

1,253,151.  Specification of Letters Patent. Patented Jan. 8, 1918.

Application filed February 21, 1917. Serial No. 150,238.

*To all whom it may concern:*

Be it known that I, JOHN C. CLENDENIN, a citizen of the United States, residing at Lynn, in the county of Sussex, in the State of Massachusetts, have invented certain new and useful Improvements in Motor Controls, of which the following is a specification.

My invention relates to the control of electric motors and it provides improved means whereby the motors may be started and stopped and be generally controlled in a safe, reliable and efficient manner.

My invention has a particular utility in the control of the electric driving motors of vehicles or tractors such as fire engines and the like, where from the necessities of the case it is required that the rotating elements of the driving motors shall be separate and independent in so far as their respective speeds of rotation are concerned. The necessity for such a control in the case of a fire engine, for instance, arises from the fact that the drive must be placed on the two front wheels with a driving motor on each of the front wheels. An element of danger is thus introduced in case the motors are connected in parallel, since if one motor is deenergized the other motor will have a dangerous tendency to instantly deflect the tractor from its path of travel. Of course, where the motors are connected in series, such a dangerous condition will not occur because opening the circuits to either driving motor opens the circuit to both motors. However, in order to operate the motors the most satisfactorily and efficiently, it is required that a series parallel control be provided for starting and for certain operating conditions, the parallel arrangement being used for normal running conditions and the series arrangement used for starting and for reduced speed running in taking heavy grades or where the road bed is rough.

One of the objects of my invention is to provide a control for electric motors, such as the driving motors of a tractor or the like, wherein, while the motors are connected in parallel, upon the occurrence of abnormal circuit conditions such as the deënergization of a portion of the motors, the other portion of the motors will be automatically and to all intents and purposes simultaneously deënergized to avoid the dangerous condition above pointed out. A further object of my invention is to provide a series parallel control for the motors, so arranged that the motors will be protected as above pointed out while they are in the parallel relation, but will not be automatically deënergized in making the transition from the one relation to the other.

In carrying my invention into effect I provide a controller for connecting the motors in series or parallel, preferably a controller which shunts one of the motors during the transition to make the transition from the one relation to the other without opening the motor circuits. In the circuit leading from the source of supply to the motors, I provide a circuit breaker which has a plurality of series coils, each coil responsive to the current in a motor circuit, the coils normally tending to neutralize each other and having no tendency to open the breaker as long as the current flowing through each coil circuit is substantially the same. When the motors are connected in parallel, in case either motor is deënergized, its corresponding breaker coil is deënergized, and the other coil being energized will operate to trip the breaker. While the transition from series to parallel or parallel to series is being made and one of the motors is shunted in the well known manner, it can be seen that the breaker coil which is in series with the motor which is being shunted would be practically without current while the other coil is fully energized. The breaker would accordingly be tripped during this transition period if some preventive means were not provided. In order to take care of this feature, I preferably place a shunt around the breaker coil of the motor which is energized during the transition, thereby deënergizing both breaker coils and permitting the breaker to remain closed. Simultaneously with completing the desired connection of the motors, the shunt from this coil is removed, thus energizing both coils to neutralize each other and permit the breaker to remain closed as long as both motors are energized.

For a better understanding of my invention, reference is had to the following description taken in connection with the accompanying drawing. Referring to the drawing, Figure 1 shows, diagrammatically, a system of motor control embodying my invention, and Figs. 2 to 5 inclusive are simplified diagrams of the various connections made by the operation of the series parallel controller shown in Fig. 1.

Referring to Fig. 1, each of the driving motors $M_1$ and $M_2$, preferably of the series wound type as shown in the drawing, is to be understood as having its rotated element separately connected to drive one of the front wheels of a vehicle. The rotating element of each motor is adapted to be connected to a vehicle wheel so as to be capable of independent rotation so as to take care of differences in speed required of the motors when the vehicle is taking turns, etc. The motors receive energy from any suitable source of supply, that shown in the drawings being the generator G which is driven by any suitable prime mover, as for instance an internal combustion engine (not shown). The speed of the motors may be varied by varying the voltage of the generator by any suitable means, the variable resistance R in the generator field circuit being provided for that purpose in the arrangement shown in the drawings. It will also be understood that the voltage of the generator and thereby the speed of the driving motors may likewise be varied by controlling the speed of the prime mover. In order to secure a more satisfactory control of the motor speeds, a series parallel controller C is provided. This controller is of the type which changes from the series to the parallel relation of the motors and vice versa without opening the motor circuits, this being accomplished by shunting the motor $M_1$ during the series parallel transition. In the circuit from the source of supply (the generator G) to the driving motors there is provided an automatic circuit breaker CB for deënergizing both motors upon the occurrence of abnormal circuit conditions such as a deënergization of one of the motors when they are connected in the parallel relation, thus avoiding the dangerous tendency of the other motor to deflect the vehicle from its path of travel. Tripping means is provided for this circuit breaker and comprises the series coils 1 and 2 included in the circuits of the motors $M_1$ and $M_2$ respectively, the arrangement being such that these coils normally neutralize each other and have no tendency to open the breaker until the motors are connected in the parallel relation and either motor is deënergized. When either motor is deënergized, its respective circuit breaker coil is deënergized and the other breaker coil is permitted to operate the pivoted latch 3 and trip the breaker. The series parallel controller C is shown in the "off" position and the arrangement is such that moving the controller to the first operative position to the right connects the motors in series, after which, moving the controller to the second operative position connects the motors in parallel without opening the motor circuits, the motor $M_1$ and its circuit breaker coil 1 being shunted during the series parallel transition and the circuit breaker coil 2 in the circuit of $M_2$ being simultaneously shunted through the resistance 4 during this transition period to prevent the tripping of the breaker. Moving the controller from the neutral position toward the left reverses the motors by reversing the current through their field circuits, and causes the vehicle to run in the reverse direction.

The operation of my invention as thus constructed and arranged is as follows:—

Figure 2:
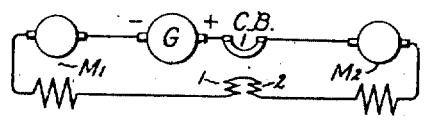
Figure 3:
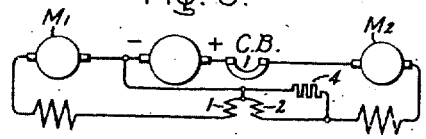
Figure 4:
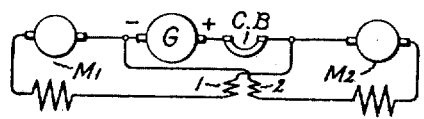

Moving the controller to the first operative position to the right energizes the motors in series from the generator G with the tripping coils 1 and 2 of the circuit breaker connected in series, the connections being as shown in simplified form in Fig. 2. The coils 1 and 2 neutralize each other and therefore have no tendency to open the breaker. In moving the controller from the first operative position to the second in order to change the motors from the series to the parallel relation, the transition from the one relation to the other is effected without opening the motor circuits by shunting the motor $M_1$ and the circuit breaker coil 1 which is in series with this motor. At the same time, the resistance 4 shunts the coil 2 to prevent this coil from tripping the breaker during the transition, the connections during the transition being as shown in Fig. 3. When the controller has been moved to the second operative position to the right, the motors are connected in parallel to the source of supply as shown in Fig. 4, the shunt circuit including the resistance 4 which had been placed around the tripping coil 2 being removed, thereby energizing both coils so as to neutralize each other and have no tendency to open the breaker as long as both of the motors are energized. Any substantial change in the energization of either motor, such as the opening of one of the motor circuits due to accidental causes, will cause the circuit breaker coil which is fully energized to trip the breaker and open the circuit to both motors, thereby preventing the tractor from being deflected from its course.

Moving the controller from the parallel position to the series position completes the circuits during the transition period as shown in Fig. 3, in the same manner as the change from the series to the parallel arrangement, and likewise prevents the tripping of the breaker during the transition.

Figure 5:
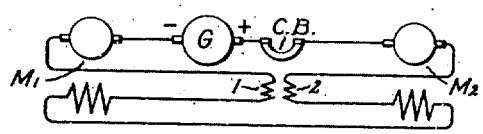

Moving the controller from the neutral position to the left reverses the connection through the series fields of the motors and causes the motors to reverse their direction of rotation in a well understood manner. The connections for the reverse operation are as shown in Fig. 5.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States is:

1. The combination with a plurality of electric motors connected in parallel relation to a source of supply, each motor separately driving a vehicle wheel, of automatic means operated responsively to the deënergization of a portion of the motors for deenergizing all the motors.

2. In combination, a plurality of electric driving motors for a vehicle, each motor separately driving a vehicle wheel, means for connecting the motors in parallel to a source of supply, and automatic means responsive to a substantial decrease in the current in one of the motor circuits for opening the connection of all the motors to the source of supply.

3. In combination, a plurality of electric motors, a controller for connecting the motors to a source of supply in series or in parallel relation, means for automatically opening the connection to the source of supply upon the occurrence of abnormal circuit conditions in a portion of the motors in the parallel relation, and means for rendering the first mentioned means inoperative during the series-parallel transition.

4. In combination, a plurality of electric motors, a series-parallel controller for the same having means for deënergizing a portion of the motors during the series-parallel transition, means for automatically deënergizing all the motors upon the occurrence of abnormal circuit conditions in a portion of the motors in the parallel relation, and means for rendering the latter means inoperative during the series-parallel transition.

5. In combination, a plurality of electric motors, a series parallel controller for the same having means for deënergizing a portion of the motors during the series-parallel transition to change from the one relation to the other without opening the motor circuits, means connecting the motors to a source of supply operated responsively to the deënergization of a portion of the motors to automatically deënergize all the motors in the parallel relation, and means for rendering the latter means inoperative to open the motor circuits during the series-parallel transition.

6. In combination a plurality of electric motors, a series parallel controller for the same having means for deënergizing a portion of the motors during the series parallel transition, an automatic circuit breaker having a plurality of tripping coils each of which is energized responsively to the current in one of the motor circuits to trip the breaker and open the connection to the source of supply upon the deënergization of another of the motors, and means for preventing tripping the breaker during the series-parallel transition.

7. The combination with a series-parallel controller for a plurality of electric motors having means for deënergizing a portion of the motors during the series-parallel transition to change from the one relation to the other without opening the motor circuits, of a circuit breaker in the circuit from the source of supply to the motors, tripping means for the circuit breaker operated responsively to a substantial change in the energization of a portion of the motors in the parallel arrangement, and means for rendering the said tripping means inoperative during the series-parallel transition.

8. In combination, a plurality of electric motors, a series parallel controller for changing the motors from the series to the parallel relation and vice versa without opening the motor circuits, an automatic circuit breaker in the circuit from the source of supply to the motors, a plurality of tripping coils for the breaker each being energized responsively to the current in one of the motor circuits in the parallel relation and to the current in the circuit of all the motors in the series relation, the said coils normally neutralizing each other and having no tendency to trip the breaker until a portion of the motors is deënergized, and means for shunting the portion of the tripping coils which is energized during the series parallel transition to prevent the tripping of the breaker during the said transition.

9. The combination with two electric driving motors for a tractor or the like, one motor for each of the tractor front wheels, of a series parallel controller for the motors having means for shunting one of the motors during the series parallel transition to change from one relation of the motors to the other without opening the motor circuits, a source of supply for the motors, an automatic circuit breaker in the circuit from the source of supply to the motors, means for tripping the breaker comprising a plurality of coils, each in series with one of the motors, the said coils normally neutralizing each other and having no tendency to trip the breaker until one of the motors is deenergized, and means for deënergizing both of said coils during the series parallel transition.

In witness whereof, I have hereunto set my hand this nineteenth day of February, 1917.

JOHN C. CLENDENIN.